US012712985B2

(12) United States Patent
Dutt et al.

(10) Patent No.: US 12,712,985 B2
(45) Date of Patent: Aug. 18, 2026

(54) VIRTUAL MEETING INACTIVITY AUTO-DISCONNECTION

(71) Applicant: Cisco Technology, Inc., San Jose, CA (US)

(72) Inventors: Hem Dutt, Delhi (IN); Faisal Siyavudeen, Kerala (IN)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 18/590,855

(22) Filed: Feb. 28, 2024

(65) Prior Publication Data

US 2025/0274565 A1 Aug. 28, 2025

(51) Int. Cl.
*H04N 7/15* (2006.01)

(52) U.S. Cl.
CPC ............. *H04N 7/157* (2013.01); *H04N 7/152* (2013.01)

(58) Field of Classification Search
CPC ............................... H04N 7/187; H04N 7/152
USPC ........................................................ 348/14.09
See application file for complete search history.

(56) References Cited

U.S. PATENT DOCUMENTS 9,241,014 B2 * 1/2016 Jayapalan ............... H04L 43/16
2008/0159503 A1 * 7/2008 Helbling ............... H04M 3/565 379/142.17
2008/0232277 A1 9/2008 Foo et al.
2011/0271192 A1 11/2011 Jones et al.
2014/0099004 A1 * 4/2014 DiBona .................... H04N 7/15 345/158
2016/0234268 A1 8/2016 Ouyang et al.
2016/0335410 A1 * 11/2016 Swank ................... G16H 40/67
2023/0086621 A1 * 3/2023 Palamadai .......... H04L 65/1073 709/204
2023/0107441 A1 * 4/2023 Kimura ................ G06Q 30/018 705/317
2023/0388392 A1 * 11/2023 Yao ......................... G06F 9/542
2025/0106268 A1 * 3/2025 Karnas .................. H04L 65/403

OTHER PUBLICATIONS

Lipautz C., "Stop Meetings on Inactivity", Eyeson, Nov. 22, 2021, pp. 1-6.
Rybczonek M., "Detecting Inactive Users", Dec. 13, 2019, pp. 1-6.

* cited by examiner

*Primary Examiner* — Binh Kien Tieu
(74) *Attorney, Agent, or Firm* — Ravi Mohan; Marc A. McClain

(57) ABSTRACT

Devices, systems, methods, and processes for conducting sustainability-aware virtual meetings are described herein. When establishing virtual meetings, each of the participants can become inactive during the meeting. This can lead to excess power and storage data being expended that is not needed. For example, when a virtual meeting is configured to end upon all participants leaving, and one participant walks away and becomes inactive, the virtual meeting can continue to be recorded and waste power. Therefore, embodiments described herein can disconnect inactive users. This can be done by monitoring audio and/or video data streams to detect either no audio being recorded or no to little changes occurring in the video data stream. When detected, a prompt may be generated with one or more cancel options. If the prompt is not cancelled within a predetermined amount of time, then the participant is logged out of the virtual meeting.

20 Claims, 10 Drawing Sheets

110
110
130
140
180
120
INTERNET
190
150
160
170
130
100

220
R5
R3
250
R4
240
35%
30%
R2
230
R1
210
200

300
310
VIRTUAL MEETING SERVICE
R6
R7
R8
R9
R10
R11
320
330
340
350
360
370
380

600

ESTABLISH A VIRTUAL MEETING
610
MONITOR USER ACTIVITY
620
SHARE ACTIVITY STATUS WITH SERVER
630
HAS INACTIVITY BEEN DETECTED ?
635
NO
YES
SHARE ACTIVITY STATUS WITH SERVER
640
GENERATE PROMPT
650
HAS PROMPT BEEN CANCELED ?
655
YES
NO
DISCONNECT INACTIVE USER FROM VIRTUAL MEETING
660

700

DETERMINE A VIRTUAL MEETING CONFIGURATION
710
MONITOR VIRTUAL MEETING USER ACTIVITY
720
725
IS A USER INACTIVE ?
NO
YES
LOWER VIRTUAL MEETING BIT RATES FOR INACTIVE USER
730
TRANSMIT INACTIVITY PROMPT TO INACTIVE USER CLIENT DEVICE
740

800

ESTABLISH A VIRTUAL MEETING
810
CONDUCT VIRTUAL MEETING
820
RECEIVE INACTIVITY PROMPT FROM VIRTUAL MEETING SERVER
830
MARK USER AS INACTIVE
840
GENERATE PROMPT
850
HAS PROMPT BEEN CANCELED ?
855
YES
NO
TRANSMIT DISCONNECTION REQUEST TO VIRTUAL MEETING SERVER
860
DISCONNECT INACTIVE USER FROM VIRTUAL MEETING
870

900

JOIN A VIRTUAL MEETING FROM A FIRST CLIENT DEVICE
910
DETECT NON-ACTIVITY
920
DETERMINE ASSOCIATION OF A SECOND CLIENT DEVICE
930
GENERATE PROMPT ON THE FIRST AND SECOND CLIENT DEVICE
940
JOIN MEETING ON THE SECOND CLIENT DEVICE
950
DISCONNECT THE FIRST CLIENT DEVICE FROM THE VIRTUAL MEETING
960

1040
LOCAL AREA NETWORK
1000
DEVICE(S)
1012
NETWORK INTERFACE CONTROLLER
1016
INPUT/OUTPUT CONTROLLER
1006
CHIPSET
PROCESSOR(S)
RAM
ROM
STORAGE CONTROLLER
1004
1008
1010
1014
1018
STORAGE
1020
OPERATING SYSTEM
APPLICATIONS
1022
1024
VIRTUAL MEETING LOGIC
MACHINE-LEARNING MODEL
1026
1028
1032
CONFIGURATION DATA
MEETING PROFILE DATA
ACTIVITY DATA
1002
ENVIRONMENT
1030

VIRTUAL MEETING INACTIVITY AUTO-DISCONNECTION

The present disclosure relates to online virtual meetings. More particularly, the present disclosure relates to dynamically disconnecting participants from virtual meetings in response to the detection of inactivity.

BACKGROUND

Virtual meetings have become increasingly popular in recent years, especially since the COVID-19 pandemic made remote work and social distancing the norm. Virtual meetings can refer to any type of meeting that takes place over the internet, using video conferencing software or other tools. These tools can be operated on personal computing devices and even mobile computing devices such as smartphones, tablets, etc.

Virtual meetings have many advantages. For example, people can collaborate from anywhere in the world, which is especially helpful for teams that are distributed across different locations. Virtual meetings also save time and money by eliminating the need for travel, as well as reducing the need for physical office space. In addition, virtual meetings can be recorded, which can be useful for reviewing discussions and decisions later on.

During a virtual meeting, participants generate and transmit various types of data. This includes audio data, such as speech and background noise captured by microphones, and video data, such as images of participants and their surroundings captured by cameras. Text data, including chat messages and typed messages, is also generated, and transmitted between participants. Additionally, screen sharing data, which includes content shared from one participant's screen to others, and metadata, such as the date and time of the meeting and participant information, are also transmitted.

The video data that is transmitted during a virtual meeting includes images of the participants and their surroundings, as captured by the cameras on their devices. This data can include live video of participants speaking or listening, as well as any movements or gestures they make during the meeting. The video data may constitute a large portion of the data transmitted during a virtual meeting. As a result, many resources may be utilized to facilitate the transmission of this data. These resources can include the use of electricity generated from a variety of non-sustainable power sources, as well as data storage space for meetings that are recorded.

SUMMARY OF THE DISCLOSURE

Systems and methods for dynamically disconnecting participants from virtual meetings in response to the detection of inactivity in accordance with embodiments of the disclosure are described herein. In some embodiments, a virtual meeting logic is configured to establish a virtual meeting with a plurality of participants, monitor participant activity, detect inactivity in at least one participant, generate an inactivity prompt, wherein the inactivity prompt is configured with a cancel option and an expiration timer, and disconnect, in response to the expiration timer expiring, the at least one participant.

In some embodiments, the virtual meeting logic is further configured to notify a virtual meeting server to mark the at least one participant as inactive.

In some embodiments, the inactivity is detected via one or more machine learning processes.

In some embodiments, the one or more machine learning processes are configured to accept audio data and video data associated with the at least one participant.

In some embodiments, the one or more machine learning processes are configured to indicate inactivity in response to a lack of audio data associated with the at least one participant.

In some embodiments, the one or more machine learning processes are configured to indicate inactivity in response to a lack of change in the video data associated with the at least one participant.

In some embodiments, the cancel option is configured to be engaged by detecting a change in the audio data or video data.

In some embodiments, the cancel option is an engageable button presented on a graphical user interface.

In some embodiments, the virtual meeting logic is further configured to, in response to detecting inactivity in at least one participant, lower a quality of the virtual meeting associated with the at least one participant.

In some embodiments, lowering the quality of the virtual meeting includes reducing a video data bit rate.

In some embodiments, lowering the quality of the virtual meeting includes reducing an audio data bit rate.

In some embodiments, a virtual meeting logic is configured to establish a virtual meeting with a participant on a first device, monitor participant activity, detect inactivity of the participant, determine the participant joining the virtual meeting on a second device, generate an inactivity prompt for display on the first device and second device, receive an acknowledgement of the inactivity prompt, and disconnect the participant from at least one device.

In some embodiments, the acknowledgement is received from the second device, and the participant is disconnected from the first device.

In some embodiments, the acknowledgement is received from the first device, and the participant is disconnected from the second device.

In some embodiments, the inactivity prompt is formatted to indicate inactivity of the first device.

In some embodiments, the second device is blocked from joining the virtual meeting until an acknowledgment is received.

In some embodiments, conducting sustainable virtual meetings includes establishing a virtual meeting with a plurality of participants, monitoring one or more activities of each of the plurality of participants, detecting inactivity associated with at least one participant of the plurality of participants, generating an inactivity prompt, wherein the inactivity prompt is configured with a cancel option and an expiration timer, transmitting the inactivity prompt to the at least one participant, and disconnecting, in response to the expiration timer expiring, the at least one participant.

In some embodiments, at least one participant is associated with a plurality of devices and the inactivity prompt is transmitted to each of the plurality of devices.

In some embodiments, inactivity is detected by monitoring data associated with the plurality of devices.

In some embodiments, the plurality of devices includes a primary device and a secondary device, and the inactivity prompt is not sent to the secondary device.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein.

Figure 1:
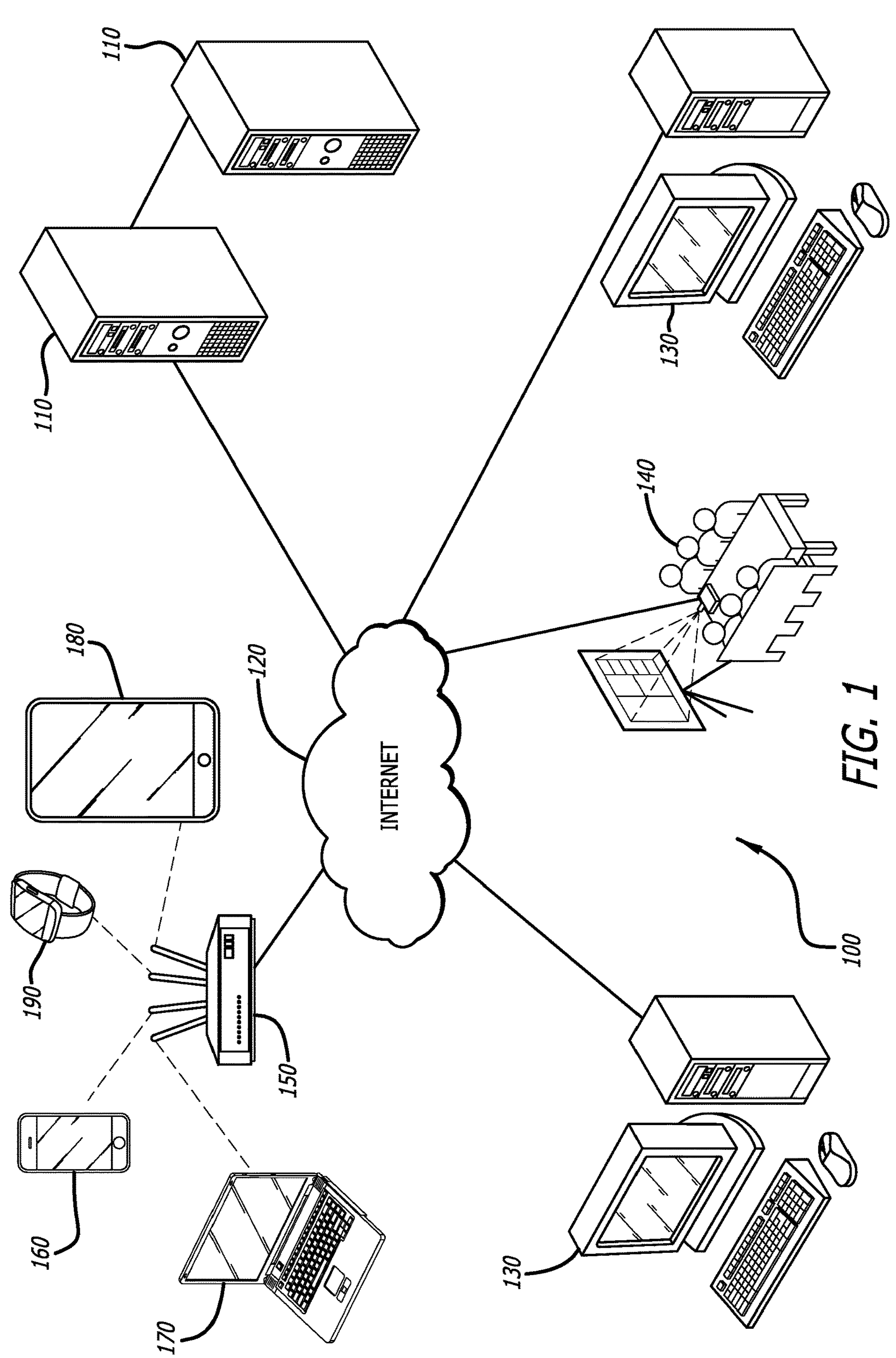
FIG. 1 is a conceptual illustration of a network with network devices powered suitable for dynamic video reduced size video transmission data rate collaborations in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

Embodiments described herein aim to detect user inactivity in online virtual meetings through a combination of factors such as audio and video activity, screen sharing, mouse activity, and more. Often, people may take important official meetings outside office times, sometimes at odd hours. After the meeting, people may leave in a hurry, without properly disconnecting or leaving the meeting. This can not only cause a waste of energy but if the virtual meeting was being recorded, it can also cause a waste of storage resource as well. Generally, in such cases, people may only notice this when they resume work the next day. In more embodiments, in a busy office during a workday, people may switch between different spaces, failing to properly leave meetings or attempting to join from a second device (like a smart phone), while their first client device is still connected, further increasing the energy used to conduct the virtual meeting. Finally, instances may occur where a person is not aware they are still logged into the virtual meeting and show themselves during times when they believe they are alone, potentially exposing various personal data.

The participant's meeting client endpoint or associated virtual meeting server can utilize one or more APIs and/or machine-learning processes or models to correlate these factors and match them against typical user usage patterns. In cases where multiple endpoints are involved, such as with PSTN or Hologram, activity detection can be performed independently on each endpoint and reported to the virtual meetings server. Virtual meeting client apps can share participants' meeting activity status with the server, which, if inactive for a configurable time, may send a notification to the client application with a warning message. The user can have the option to continue the meeting to avoid automatic closure. Additional embodiments may include the ability to connect from an alternative device, administration settings to override auto-kill for specific meetings, and a learning model for individual user patterns over time. In various embodiments with captions and/or chat enabled, the text data can be processed to adjust inactivity sensitivity. In some embodiments, instead of immediate disconnection, a suggested "energy-saving mode" can allow the user's endpoint to enter a low-energy state before complete disconnection, facilitating a more user-friendly approach to handling inactivity.

Detecting an inactive user in an online virtual meeting can involve several methods to ensure participants remain engaged and attentive. One common approach is monitoring participants' video feeds for signs of inactivity, such as lack of movement or a frozen screen. Additionally, tracking microphone activity helps identify users who may not be actively contributing to the discussion. Some platforms also offer features like "raise hand" or participation indicators, allowing users to signal their engagement. Regularly incorporating interactive elements like polls, Q&A sessions, or breakout discussions encourages participants to actively participate, and lack of response can indicate inactivity. Utilizing advanced analytics and algorithms can analyze user behavior patterns, identifying prolonged periods of inactivity. It's important to strike a balance between ensuring engagement and respecting participants' privacy, implementing these methods judiciously to enhance the overall effectiveness of virtual meetings.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual illustration of a network 100 with network devices powered suitable for sustainability-aware virtual meetings in accordance with various embodiments of the disclosure is shown. In many embodiments, the network 100 may comprise a plurality of devices that are configured to transmit and receive data related to providing, recording, and processing virtual meetings (i.e., online collaborations). In various embodiments, virtual meeting service servers 110 are connected to a wide-area network such as, for example, the Internet 120. In further embodiments, virtual meeting service servers 110 can be configured to transmit a variety of data across the Internet 120 to any number of computing devices such as, but not limited to, personal computers 130, virtual presentation devices 140, and mobile computing devices including laptop computers 170, cellular phones 160, portable tablet computers 180 and wearable computing devices 190. In additional embodiments, virtual meeting data may be mirrored or otherwise supplemented in additional cloud-based service provider servers or edge network systems. In still additional embodiments, the virtual meeting service servers 110 can be hosted as virtual servers within a cloud-based service.

In further embodiments, the sending and receiving of virtual meeting data can occur over the Internet 120 through wired and/or wireless connections. In the embodiment depicted in FIG. 1, the mobile computing devices are connected wirelessly to the Internet 120 via a wireless network access point 150. It should be understood by those skilled in the art that the types of wired and/or wireless connections between devices on the network 100 can be comprised of any combination of devices and connections as needed.

In various embodiments, the network 100 may broadly accept virtual meeting data, such as, but not limited to audio and video data from users via personal computers 130, virtual presentation devices 140, and/or mobile computing devices. These embodiments may, based on one or more thresholds or other network conditions/configurations, that video data may need to be transmitted to very other device within a virtual meeting. This may require determining the quantity of video transmissions within the virtual meeting. In more embodiments, the video being transmitted within the video data can utilize a reduced size video transmission data rate to transmit video frames at a lower rate than the standard frame rate, thereby reducing the amount of data that needs to be transmitted and processed over the Internet 120.

As discussed in more detail below, virtual meetings can be established that have a certain configuration. Based upon this configuration, various sustainability attributes data can be collected. Various features and/or configurations can be selected that increase the overall sustainability of the virtual meeting. These changes can be monitored throughout the meeting. Based on these changes during a virtual meeting, the configurations can change either automatically or in response to a participant being prompted to change one or more configurations or settings.

Although a specific embodiment for a network 100 suitable for utilizing a reduced size video transmission data rate within a virtual meeting is described above with respect to FIG. 1, any of a variety of systems and/or processes may be utilized in accordance with embodiments of the disclosure. For example, the virtual meeting service servers 110 may be configured to receive data and transfer it to another device within the network 100. In this way, it may be configured as a relay of the data. However, in some embodiments, the selection of data rate can be done on one or more user devices. The elements depicted in FIG. 1 may also be interchangeable with other elements of FIGS. 2-10 as required to realize a particularly desired embodiment.

Figure 2:
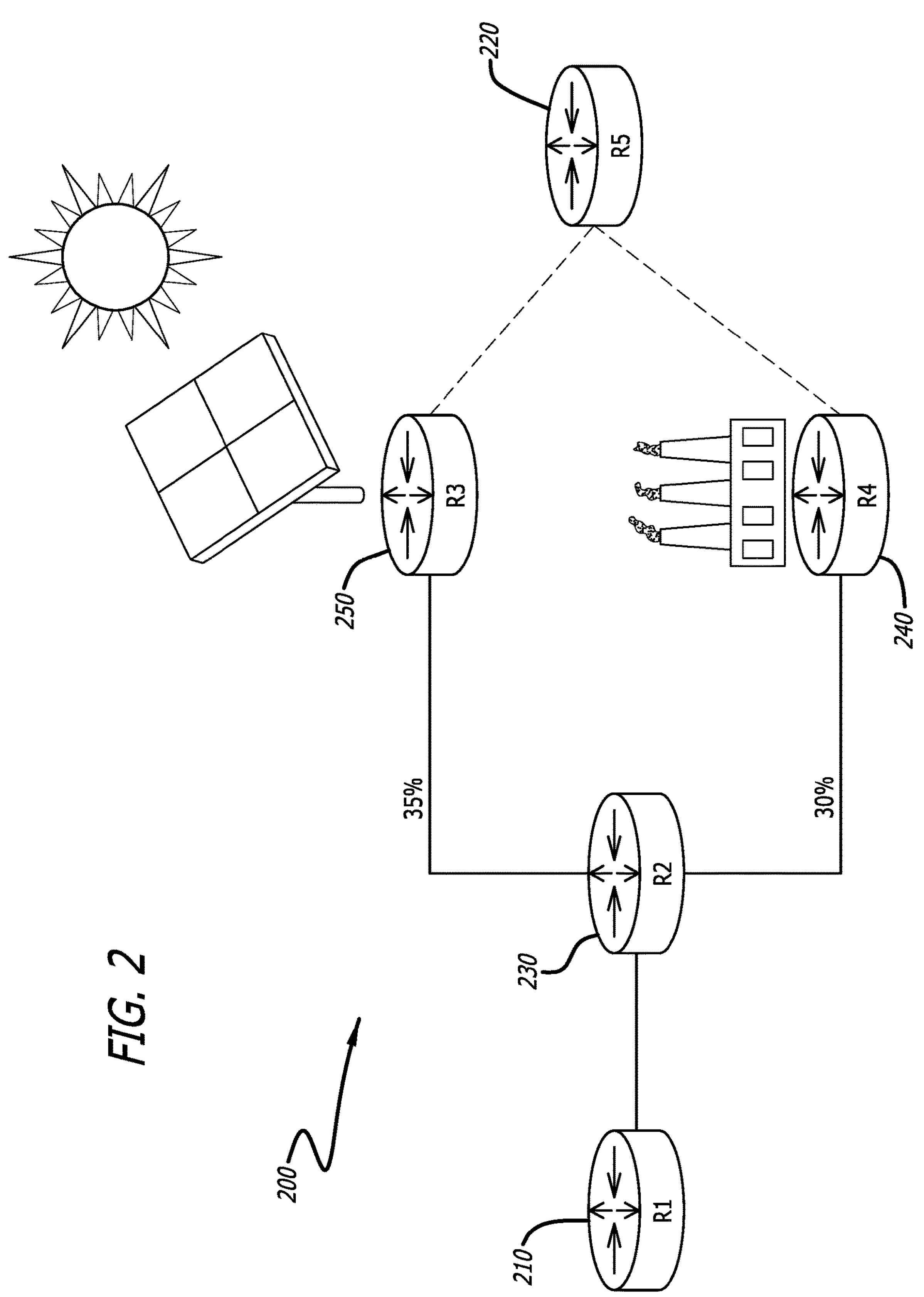
FIG. 2 is a simplified diagram of a network of devices suitable for virtual meetings powered by different power sources in accordance with various embodiments of the disclosure.

Referring to FIG. 2, a simplified diagram of a network of devices suitable for virtual meetings powered by various power source types in accordance with various embodiments of the disclosure is shown. The network 200 can include a plurality of devices, e.g., routers, which can be in communication with each other and/or a remote server, which may be connected to the network via a router 220 (R5). The network 200 depicted in FIG. 2 is shown as a simplified, conceptual network where a router 210 (R1) is connected to a router 230 (R2) which may route data to router 250 (R3) or router 240 (R4) onward to router 220 (R5). Those skilled in the art will understand that a network 200 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like “power lines,” “power grids,” power source,” “power consumption,” and “power plant” when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 200 have not considered various aspects of operation that can relate to the overall sustainability of the network. For example, devices in communication networks have often used grid-supplied energy as a primary power source. This grid-supplied energy can regularly provide energy that has been generated by a non-sustainable or negative environmental impacts-heavy power source such as a coal-powered power plant. However, modern power grids often have more diverse and cleaner energy sources for the provided generated energy. Some devices can still be powered by power sources that utilize fossil fuels, such as the router 240 (R4) as depicted in FIG. 2. Alternatively, some devices can operate by using renewable sources of energy, such as the router 250 (R3) which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability attributes.

In the embodiment depicted in FIG. 2, the operation of a non-sustainable coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to a subsequent event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability attributes of that network device. During operation, one or more devices within the network may seek and collect the sustainability attributes of various network devices, which can provide insight into both the type of power source providing power to the device, but also the various capabilities of the network device that may be activated to provide more efficient operation.

Additionally, when generating various scores, metrics, or other evaluations of the network devices within a network 200, the sustainability attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 200 is described above with respect to FIG. 2, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 2 may also be interchangeable with other elements of FIGS. 1 and 3-10 as required to realize a particularly desired embodiment.

Figure 3:
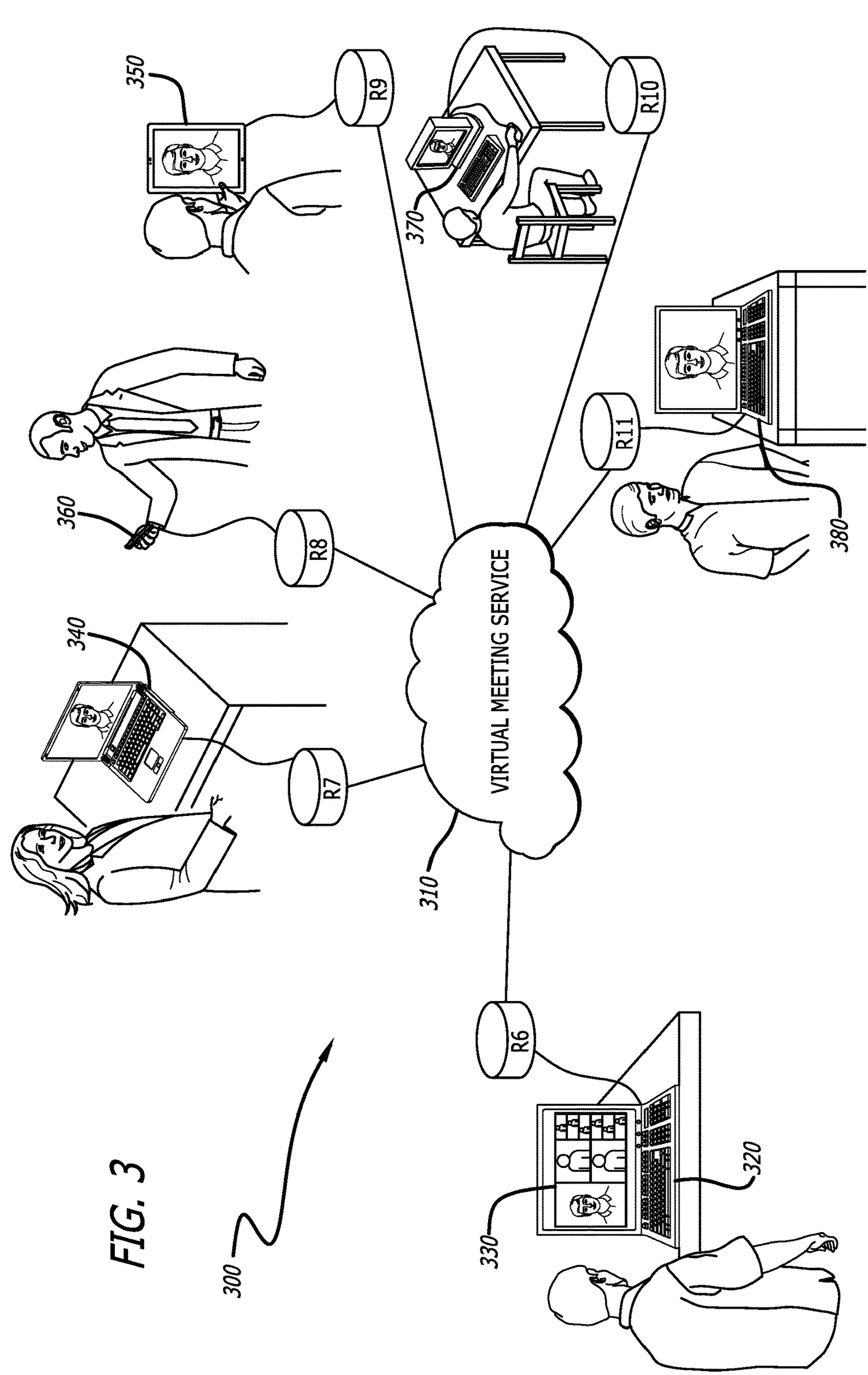
FIG. 3 is a conceptual schematic diagram of a one-to-many virtual meeting in accordance with various embodiments of the disclosure.

Referring to FIG. 3, a conceptual schematic diagram of a one-to-many virtual meeting 300 in accordance with various embodiments of the disclosure is shown. In some virtual meetings, it can be configured such that one (or a few) people are the main subjects of the meeting and that many other attendees will be primarily watching them. During these one-to-many meetings, there is a majority of dialogue from the presenter to the attendees.

In the embodiment depicted in FIG. 3, the presenter may utilize their personal computing device, such as a first laptop 320 to capture and generate a video transmission (conceptually shown as the subject captured in frame). The virtual meeting can be facilitated by a virtual meeting service 310 that can connect one or more attendees together. The presenter may connect to the virtual meeting service over a network through a plurality of network devices (conceptually shown as router R6). During the presentation of the virtual meeting, the video transmission 330 can be transmitted to the various attendees, such as to a second laptop 340 (through a plurality of network devices conceptually shown as router R7), a smartphone 360 (through a plurality of network devices conceptually shown as router R8), a tablet 350 (through a plurality of network devices conceptually shown as router R9), a desktop computer (through a plurality of network devices conceptually shown as router R10), and a third laptop 380 (through a plurality of network devices conceptually shown as router R11).

During the virtual meeting, the video transmission 330 can be shown on each of the network-connected devices of the attendees. However, to reduce the amount of data and/or power that is required, one or more configurations or settings on the devices can be changed. Thus, the virtual meeting may be conducted in a more sustainable way.

Figure 4:
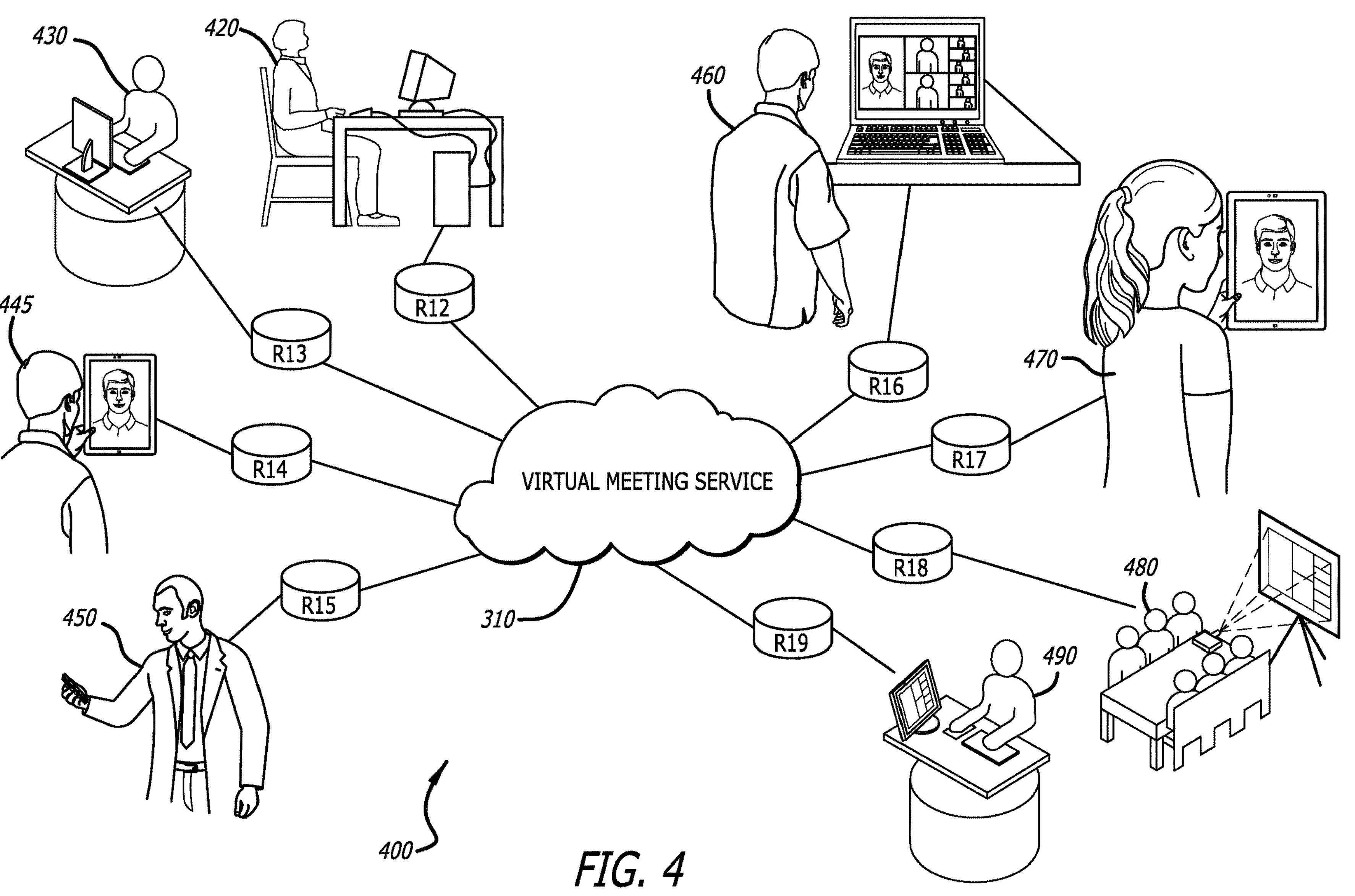
FIG. 4 is a conceptual schematic diagram of a many-to-many virtual meeting in accordance with various embodiments of the disclosure.

Referring to FIG. 4, a conceptual schematic diagram of a many-to-many virtual meeting 400 in accordance with various embodiments of the disclosure is shown. In some virtual meetings, it can be configured such that everyone can be the main subject of the meeting depending on who is speaking. During these many-to-many meetings, no attendee necessarily has a majority of dialogue during the meeting.

In the embodiment depicted in FIG. 4, the attendees 420-490 may utilize their available computing devices, such as, but not limited to, laptop computers, desktop computers, smartphones, tablets, and/or presentation devices to capture and generate a video transmission. This may require determining the quantity of video transmissions within the virtual meeting. These computing devices can each be connected to a virtual meeting service 310 through a plurality of network devices conceptually shown as routers R12-R19. The virtual meeting service 310 can connect one or more attendees together.

Similar to the virtual meeting depicted in FIG. 3, the video transmission can be shown on each of the network-connected devices of the attendees 420-490. However, to reduce the amount of data and/or power that is required to be transmitted by the virtual meeting service 310, one or more capabilities or features can be enabled and/or disabled. In some embodiments, a user may be prompted to change devices. For example, user 490 may be prompted to join an audio only virtual meeting via a phone which typically requires far less power to join the same meeting.

Although specific embodiments for virtual meetings are described above with respect to FIGS. 3-4, any of a variety of systems and/or processes may be utilized in accordance with embodiments of the disclosure. For example, the virtual meetings may be conducted in a peer-to-peer configuration wherein the processes carried out by the virtual meeting service 310 are instead conducted on one or more of the client applications within the computing devices of the attendees. The elements depicted in FIGS. 3-4 may also be interchangeable with other elements of FIGS. 1-2 and 5-10 as required to realize a particularly desired embodiment.

Figure 5:
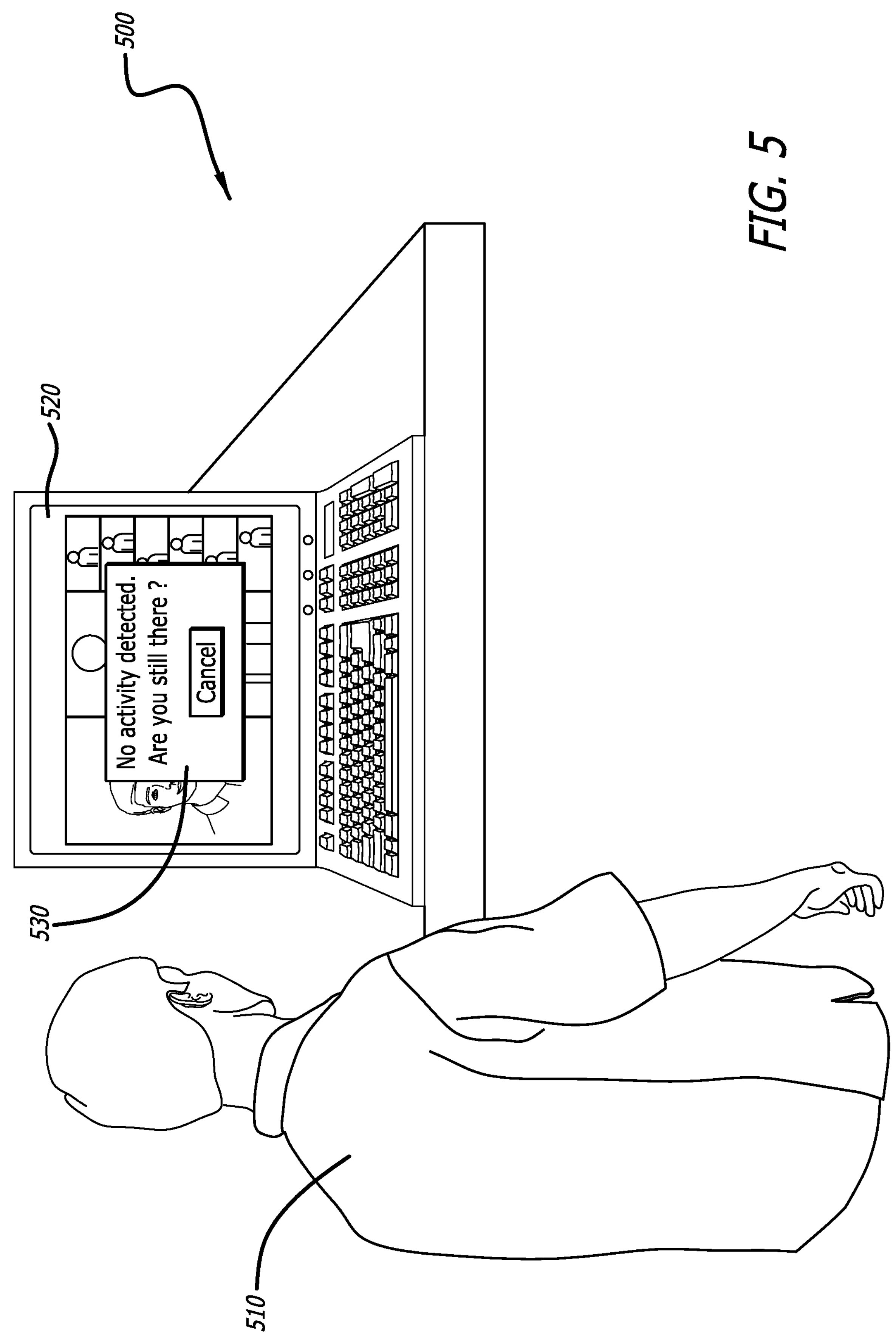
FIG. 5 is a conceptual illustration of an inactivity prompt in a virtual meeting in accordance with various embodiments of the disclosure.

Referring to FIG. 5, a conceptual illustration 500 of an inactivity prompt 530 in a virtual meeting 520 in accordance with various embodiments of the disclosure is shown. In many embodiments, a user/participant 510 can establish or otherwise engage in a virtual meeting 520 with a plurality of other participants. Various embodiments herein can generate and display an inactivity prompt 530 in response to certain actions, such as the detection of inactivity.

In a number of embodiments, the inactivity prompt 530 can be configured with a cancel option that can exit out of the inactivity prompt 530 and reset any inactivity timer, setting, or monitoring loop. In the embodiment depicted in FIG. 5, the cancel option is an engageable button presented within a prompt presented on a graphical user interface. However, other cancel options may be available, including, but not limited to, detecting a change in an audio or video data stream. For example, when presented with an inactivity prompt, the prompt may be cancelled if a change in activity is suddenly detected. This can be hearing a sound (e.g., a participant speaking), or seeing a change in the video data stream (e.g., a participant waves his hands, etc.).

As described in more detail below, the participant 510 may have multiple computing devices that can also interact with the virtual meeting 520. In these embodiments, the inactivity prompt may be transmitted or otherwise appear on any or all of their devices. However, unless a primary device and a secondary device are established (such as a group meeting room, or a material presentation device), typically a participant 510 may only have one device log into the virtual meeting at a time to conserve power.

Although a specific embodiment for a conceptual illustration of an inactivity prompt in a virtual meeting is described above with respect to FIG. 5, any of a variety of systems and/or processes may be utilized in accordance with embodiments of the disclosure. For example, X. The elements depicted in FIG. 5 may also be interchangeable with other elements of FIGS. 1-4 and 6-10 as required to realize a particularly desired embodiment.

Figure 6:
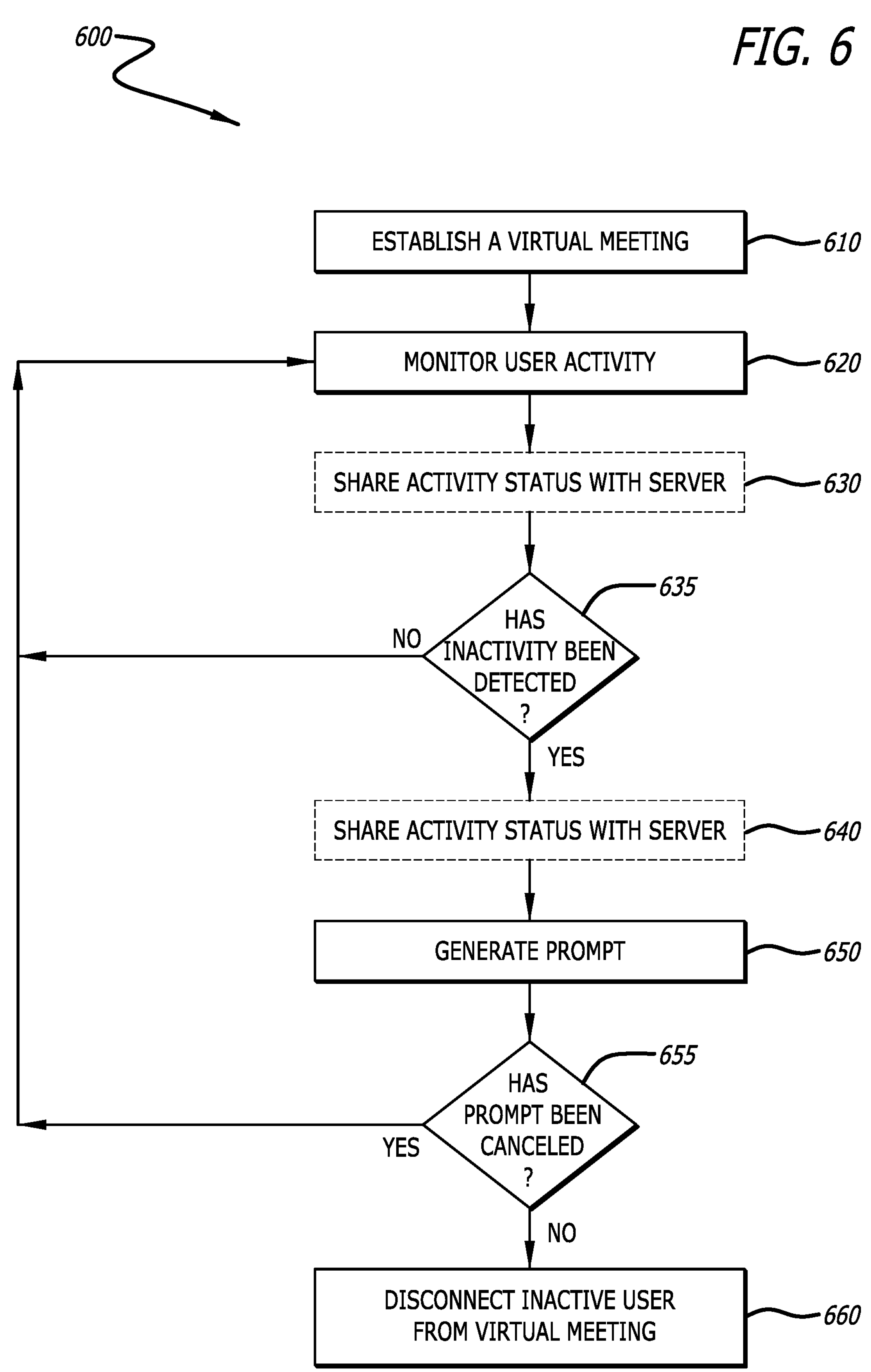
FIG. 6 is a flowchart depicting a process for disconnecting an inactive participant from a virtual meeting in accordance with various embodiments of the disclosure.

Referring to FIG. 6, a flowchart depicting a process 600 for disconnecting an inactive participant from a virtual meeting in accordance with various embodiments of the disclosure is shown. In many embodiments, the process 600 can establish a virtual meeting (block 610). Virtual meetings between devices can be established through various online communication platforms and applications. These platforms facilitate real-time audio and video interactions, enabling users to connect seamlessly regardless of geographical distances. Users typically need a stable internet connection, a compatible device (such as a computer, smartphone, or tablet), and the relevant software or client installed. Participants can share screens, exchange messages, and collaborate on documents during these meetings.

In a number of embodiments, the process 600 can monitor user activity (block 620). Monitoring activity in a virtual meeting can be achieved through various features and tools provided by online communication platforms. Hosts and organizers typically have access to controls that allow them to oversee participant engagement and behavior. Video feeds enable visual observation of attendees, while audio features provide insights into verbal interactions. Various platforms may also provide analytics and reporting tools that offer insights into participant engagement levels and contributions.

In some optional embodiments, the process 600 can share an activity status a server (block 630). In certain embodiments, a client application can share activity-related data with a virtual meeting server or other backbone device to facilitate seamless communication and collaboration. When participants engage in the meeting through the client application, various types of data are generated, including audio and video streams, chat messages, screen sharing, and user interactions. The client application is designed to transmit this data securely to a virtual meeting server or the like. The client application may periodically send updates to the server, providing real-time information on participant activities, such as joining or leaving the meeting, raising hands, or sharing screens. This data exchange enables the server to manage the meeting environment efficiently, coordinating and synchronizing the activities of all participants. Security measures are often implemented to protect the transmitted data, ensuring the confidentiality and integrity of the virtual meeting interactions.

In more embodiments, the process 600 can determine if inactivity has been detected (block 635). As described above, inactivity can be determined in a number of ways. If inactivity has not been found (i.e., activity has been detected), then the process 600 can again continue to monitor a user's/participant's activity (block 620). However, if inactivity has been detected, then the process 600 can, in certain optional embodiments, share the activity with a server (block 640). This may be to mark the participant as inactive and to start an inactivity process.

In additional embodiments, the process 600 can generate a prompt (block 650). The generation of a prompt in a computing device can involve the creation of a specific instruction or query that prompts the system to perform a subsequent action or cycle to await user input. A prompt can be a text-based message or indicator displayed on a graphical user interface, prompting the user to provide information, make a decision, or execute a command. There are various types of prompts used in computing devices. Dialog prompts are prevalent in graphical user interfaces, presenting users with options, forms, or messages that require their input or decision. Confirmation prompts seek user verification before executing critical actions, helping prevent accidental operations. Input prompts, error prompts, and password prompts can prompt users to enter authentication credentials.

In further embodiments, the process 600 can determine if the prompt has been canceled (block 655). As shown above with respect to the embodiment depicted in FIG. 5, a prompt can be generated and displayed to a participant during a virtual meeting. The prompt can be formatted such that it will automatically disconnect the participant unless they cancel out the prompt. If the prompt is cancelled, the process 600 can continue to monitor user activity (block 620).

However, if the prompt has not been cancelled, the process 600 can disconnect the inactive user from the virtual meeting (block 660). This action can be taken to reduce unneeded negative environmental effects, such as wasted power generation, etc. Some embodiments may offer options for temporarily removing participants or permanently expelling them the virtual meeting (e.g., the participant is disconnected for inactivity multiple times, etc.).

Although a specific process for disconnecting an inactive participant from a virtual meeting is described above with respect to FIG. 6, any of a variety of systems and/or processes may be utilized in accordance with embodiments of the disclosure. For example, multiple participants may be detected with inactivity at once, such as when a meeting ends but one or more person has walked away from their computer. In various embodiments, the virtual meeting may be termination if the last person is disconnected due to inactivity. The elements depicted in FIG. 6 may also be interchangeable with other elements of FIGS. 1-5 and 7-10 as required to realize a particularly desired embodiment.

Figure 7:
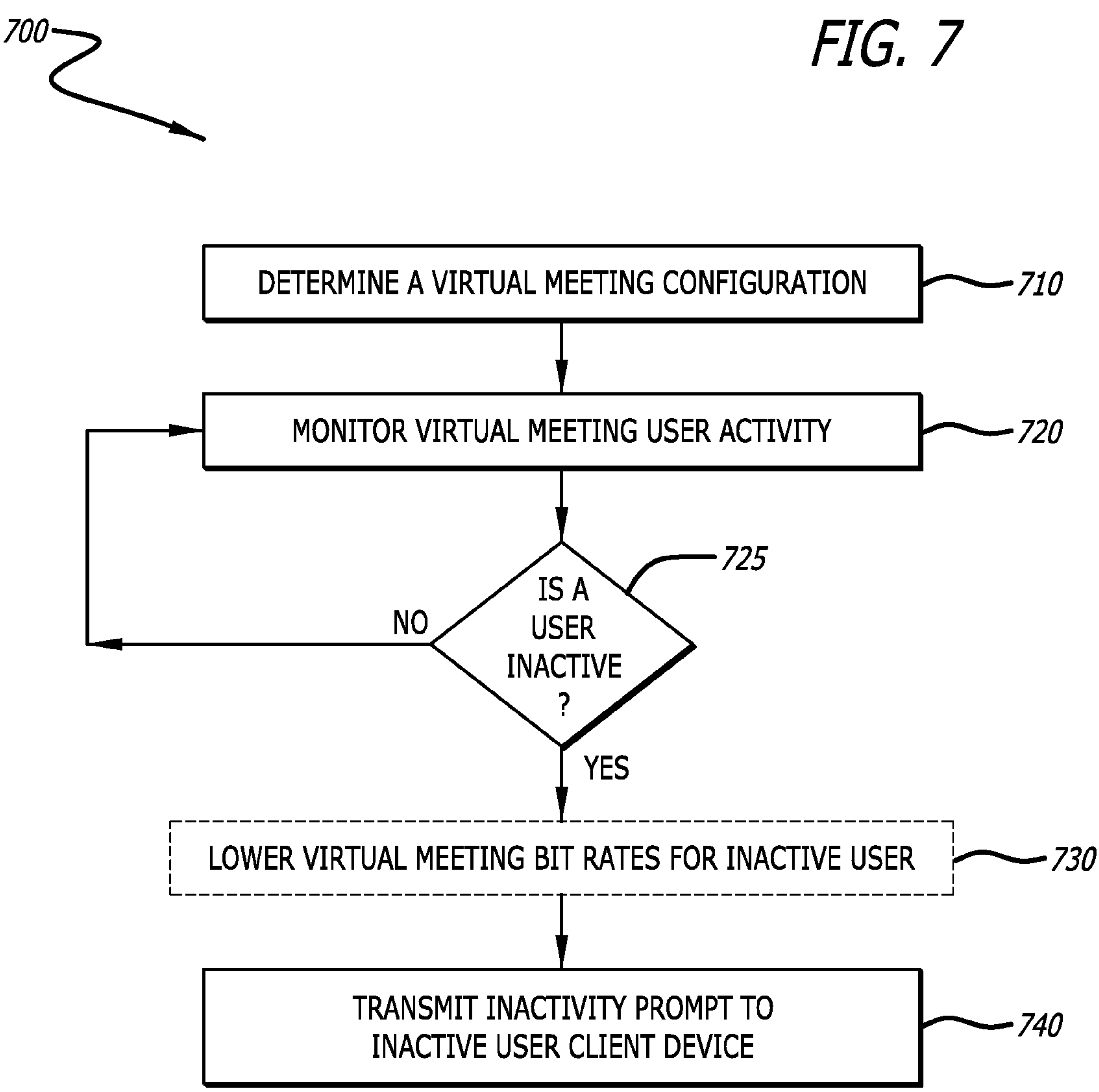
FIG. 7 is a flowchart depicting a process for transmitting an inactivity prompt in a virtual meeting in accordance with various embodiments of the disclosure.

Referring to FIG. 7, a flowchart depicting a process 700 for transmitting an inactivity prompt in a virtual meeting in accordance with various embodiments of the disclosure is shown. In many embodiments, the process 700 can determine a virtual meeting configuration (block 710).

In a number of embodiments, the process 700 can monitor the virtual meeting for user activity (block 720). As discussed above, user activity can be monitored in a number of ways. This may include processing a video or audio data stream. Audio data streams with no sound or video data streams with no changes may indicate that a participant is inactive.

In some embodiments, the process 700 can determine if a user is inactive (block 725). If a user is determined to not be inactive (i.e., the user is active), the process 700 can continue to monitor the virtual meeting (block 720). However, if the user is in fact determined to be inactive, then some embodiments of the process 700 can lower the virtual meeting bit rates for the inactive user (block 730). This may be done during the time that a prompt is generated until the participant either is disconnected or cancels the inactivity prompt.

In additional embodiments, the process 700 can transmit an inactivity prompt to inactive user client device (block 740). The inactivity prompt may be a graphical user interface prompt, a notification on a mobile computing or wearable device, or any other typical message transmission system that may be noticed by the user. In certain embodiments, the process 700 may additionally transmit an inactivity report to a host, admin, or other participant of the virtual meeting.

Although a specific process for transmitting an inactivity prompt in a virtual meeting is described above with respect to FIG. 7, any of a variety of systems and/or processes may be utilized in accordance with embodiments of the disclosure. For example, the process 700 may mark a participant as inactive upon generating the prompt until the participant is either disconnected or cancels the prompt. This may allow for further messages, actions, or other events to occur. The elements depicted in FIG. 7 may also be interchangeable with other elements of FIGS. 1-6 and 8-10 as required to realize a particularly desired embodiment.

Figure 8:
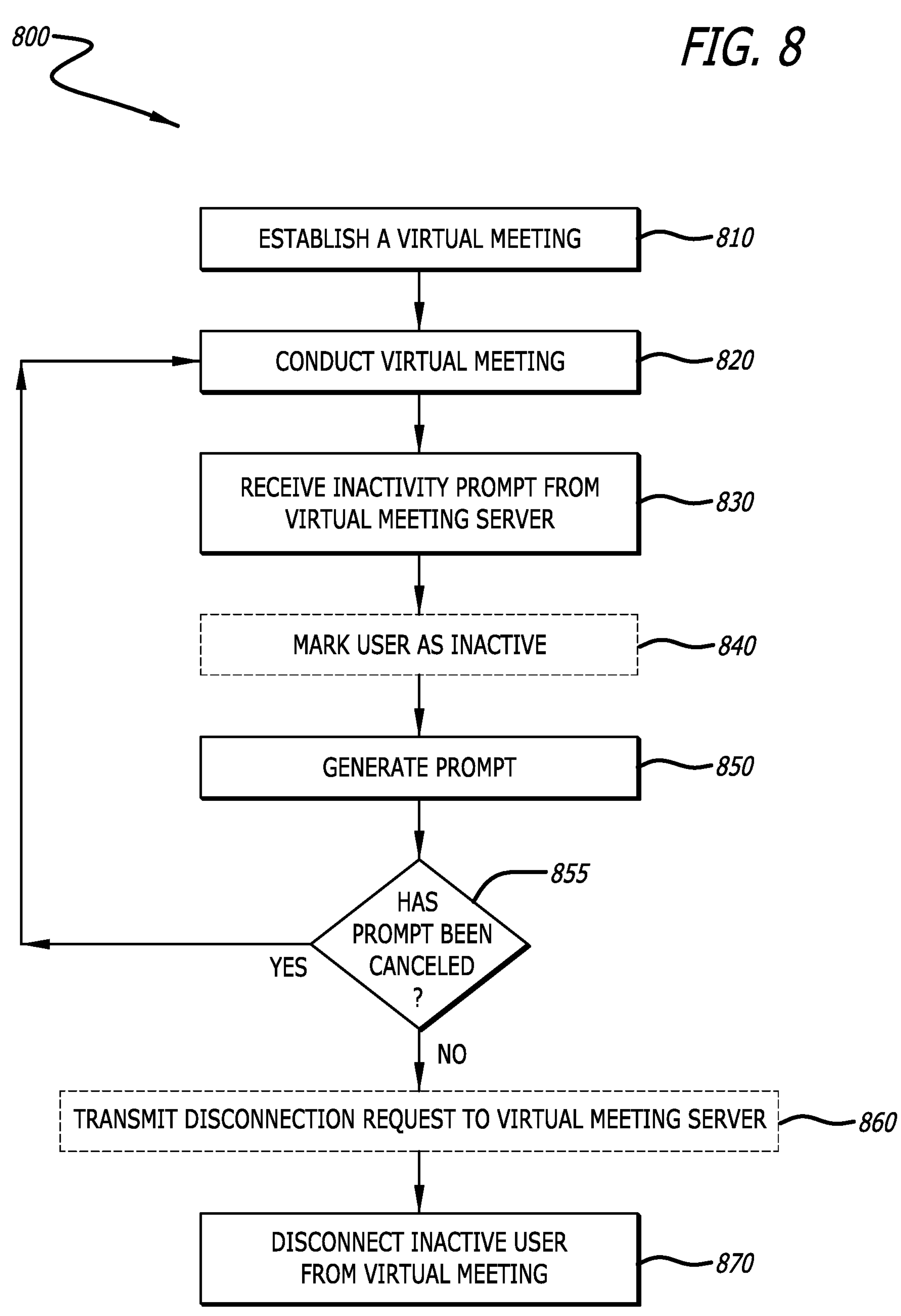
FIG. 8 is a flowchart depicting a process for handling an inactivity prompt in a virtual meeting in accordance with various embodiments of the disclosure.

Referring to FIG. 8, a flowchart depicting a process 800 for handling an inactivity prompt in a virtual meeting in accordance with various embodiments of the disclosure is shown. In many embodiments, the process 800 can establish a virtual meeting (block 810). As described above, virtual meetings can be configured to be between two or more network devices and can be established through various online communication platforms and applications. These platforms may facilitate real-time or near real-time audio and video interactions, enabling users to connect seamlessly regardless of geographical distances.

In a number of embodiments, the process 800 can conduct the virtual meeting (block 820). As described above with reference to FIGS. 3 and 4, virtual meetings can be configured in a variety of ways between a plurality of participants. Virtual meetings can last anywhere from a few minutes to a few hours. Often these virtual meetings are concluded upon all participants leaving, but may be ended by a host. However, in certain scenarios, a participant may be inactive, which can lead to a virtual meeting not ending on time and causing excess power and data to be utilized when not needed.

In more embodiments, the process 800 can receive an inactivity prompt from virtual meeting server (block 830). In these embodiments, the virtual meeting server is monitoring data to detect inactivity of one or more participants. The prompt may comprise the prompt itself, or may be a signal indicating that the generation of an inactivity prompt is requested.

In some optional embodiments, the process 800 can mark a user as inactive (block 840). In certain embodiments, marking a user as inactive may trigger one or more additional steps. For example, an additional prompt may be given upon returning to the virtual meeting, perhaps indicating that the participant was previously logged out for inactivity, etc. This marking may be internal, but may also be transmitted out to an external network device like a virtual meeting server.

In additional embodiments, the process 800 can generate a prompt (block 850). As shown above with respect to the embodiment depicted in FIG. 5, a prompt can be generated and displayed to a participant during a virtual meeting. The prompt can be formatted such that it will automatically disconnect the participant unless they cancel out the prompt. The prompt can self-execute a disconnection if a timer with a predetermined set of time elapses.

In further embodiments, the process 800 can determine if the prompt has been cancelled (block 855). If the prompt has been cancelled, the process 800 can continue to conduct the virtual meeting (block 820). In some embodiments, the cancellation of the prompt can be a result of a button within the prompt being engaged. In still more embodiments, the cancellation may be determined by tracking a user activity, such as, but not limited to, gaze tracking, motion tracking, and audio tracking, etc.

However, if the prompt has not been cancelled, the process 800 can, in optional embodiments, transmit a disconnection request to the virtual meeting server (block 860). In some embodiments, the process 800 may attempt to disconnect itself by ceasing transfer of data. However, this may be interpreted by a virtual meeting server that the disconnection was inadvertent and may be followed up by a number of reconnection attempts. These reconnection attempts would not be required and may therefore expend unneeded power and computing resources. As a result, transmitting a disconnection request or notice may be desired in these embodiments.

In various embodiments, the process 800 can disconnect an inactive user from the virtual meeting (block 870). Disconnection can be accomplished by starting a formal disconnection process. In some embodiments, the process 800 may simply cease to transfer data with any external devices. In certain embodiments, the process 800 may receive or be subject to a disconnection from a virtual meeting server.

Although a specific process for handling an inactivity prompt in a virtual meeting is described above with respect to FIG. 8, any of a variety of systems and/or processes may be utilized in accordance with embodiments of the disclosure. For example, the process 800 may be carried out within a centralized virtual meeting service or may be carried out on a virtual meeting client software, such as the software associated with the virtual meeting host. The elements depicted in FIG. 8 may also be interchangeable with other elements of FIGS. 1-7 and 9-10 as required to realize a particularly desired embodiment.

Figure 9:
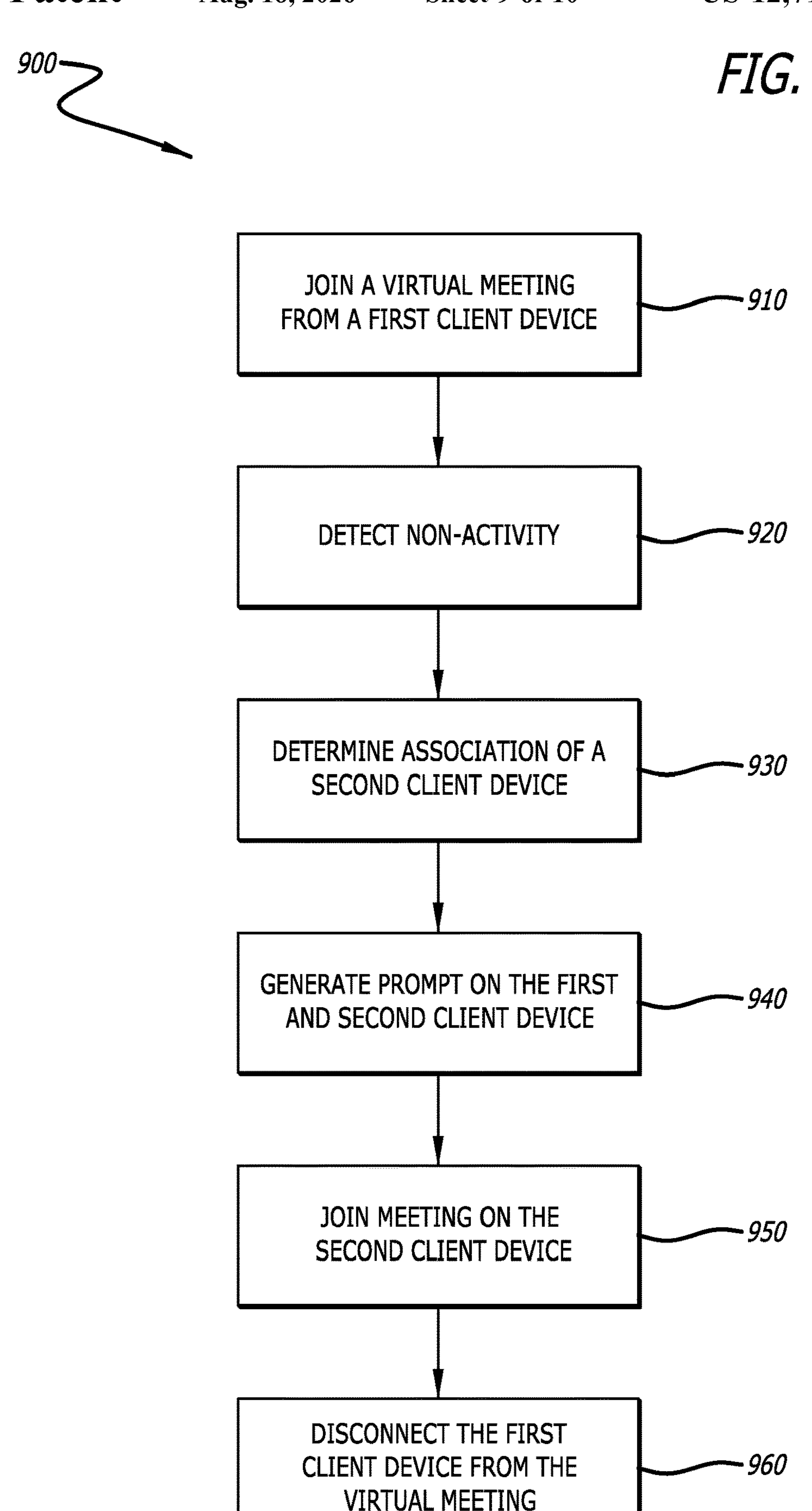
FIG. 9 is a flowchart depicting a process for disconnecting an inactive device from a virtual meeting in accordance with various embodiments of the disclosure.

Referring to FIG. 9, a flowchart depicting a process 900 for disconnecting an inactive device from a virtual meeting in accordance with various embodiments of the disclosure is shown. In more embodiments, the process 900 can join a virtual meeting from a first client device (block 910). This may be a desktop computer, laptop, or any computing device capable of connecting to the virtual meeting.

In a number of embodiments, the process 900 can detect non-activity (block 920). As described above, non-activity (i.e., inactivity) can be detected through various means such as monitoring data streams at a virtual meeting server. However, in certain embodiments, such as during secure virtual meetings, the virtual meeting may not have access to monitor the data streams for inactivity. In these embodiments, the virtual meeting client may be tasked with monitoring inactivity of the participant.

In more embodiments, the process 900 can determine association of a second client device (block 930). A participant may attempt to log into a virtual meeting from a second computing device. For example, a participant may initially engage in a virtual meeting from a desktop, but may walk away without disconnecting, and subsequently attempt to log back into the virtual meeting from a smart phone, tablet, etc.

In additional embodiments, the process 900 can generate a prompt on the first and second client device (block 940). In order to notify the participant of the dual device joining, each of the devices associated with the participant can be sent or directed to display a prompt indicating as such. In some embodiments, the prompt can be an inactivity prompt. However, in certain embodiments, the prompt may be configured to inform the participant of the multiple devices joined to the virtual meeting, and, in some instances, offer an option to disconnect the first client device.

In further embodiments, the process 900 can join the virtual meeting on the second client device (block 950). The participant may elect to join the virtual meeting from the second client device, despite the warning that they are still logged in on a first client device. As a result, in still more embodiments, the process 900 can disconnect the first client device from the virtual meeting (block 960). However, if the participant decides to instead use the first client device that is inactive, then the process 900 can disconnect the second client device from the virtual meeting, or perhaps stop the second client device from joining the virtual meeting at all.

Although a specific process for disconnecting an inactive device from a virtual meeting is described above with respect to FIG. 9, any of a variety of systems and/or processes may be utilized in accordance with embodiments of the disclosure. For example, certain embodiments may include a primary and secondary client device that may be needed for certain virtual meeting scenarios such as, but not limited to, an overhead or group camera. In these instances, a host, admin, or virtual meeting server can avoid disconnecting participants associated with multiple devices. The elements depicted in FIG. 9 may also be interchangeable with other elements of FIGS. 1-8 and 10 as required to realize a particularly desired embodiment.

Figure 10:
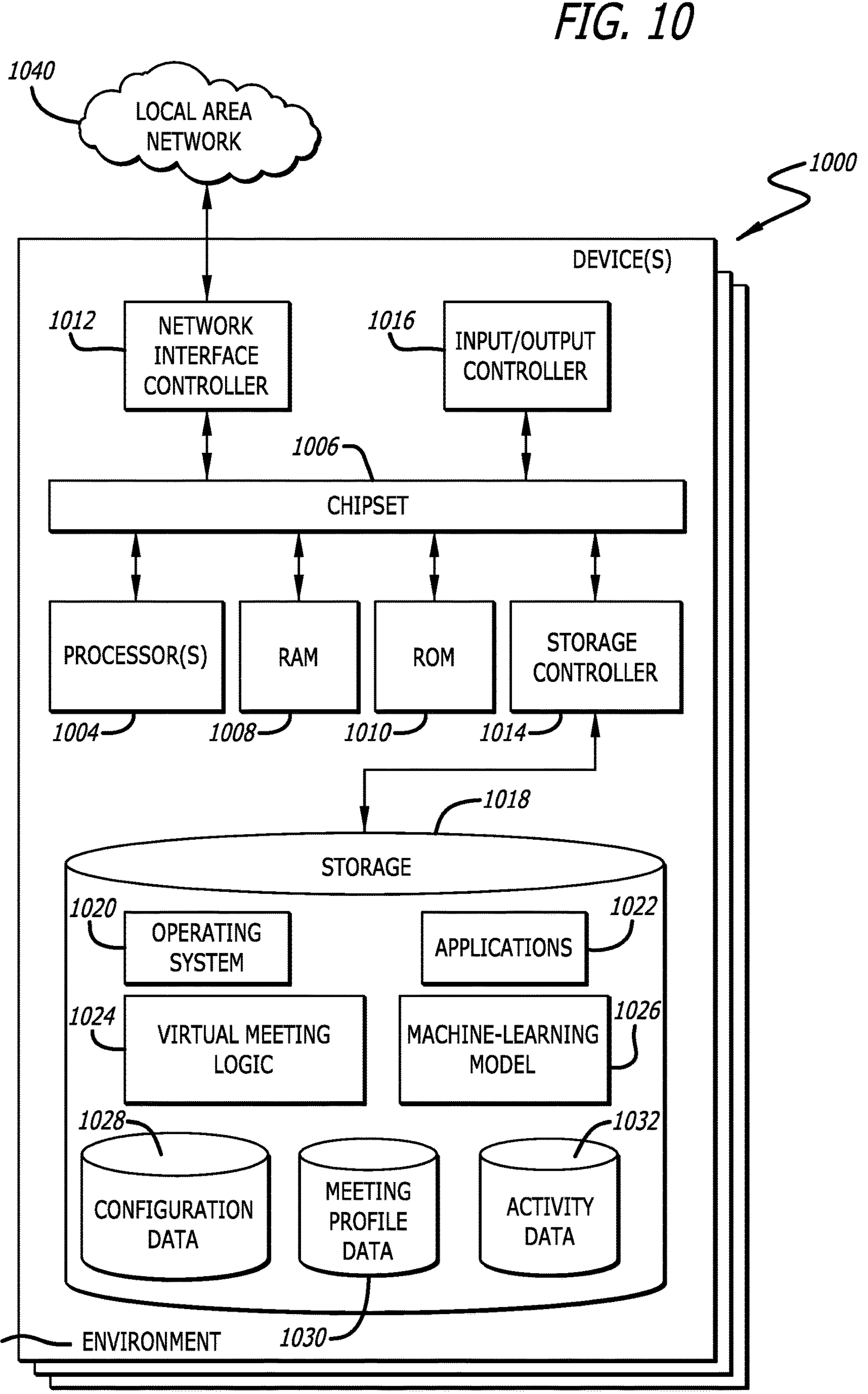
FIG. 10 is a conceptual block diagram of a device suitable for use in a sustainability-aware virtual meeting system in accordance with various embodiments of the disclosure.

Referring to FIG. 10, a conceptual block diagram of a device 1000 suitable for use in a sustainability-aware virtual meeting system in accordance with various embodiments of the disclosure is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the applications and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more controller(s) 1004, such as, but not limited to, central processing units (CPUs), processors, etc. that can be configured to operate in conjunction with a chipset 1006. The controller(s) 1004 can be standard programmable CPUs that perform arithmetic and logical operations necessary for the operation of the device 1000.

In additional embodiments, the controller(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the controller(s) 1004 and the remainder of the components and devices within the environment 1002. The chipset 1006 can provide an interface to a random-access memory (RAM 1008), which can be used as the main memory in the device 1000 in some embodiments. In a number of embodiments, the memory can be communicatively coupled to the controller(s) 1004 to carry out one or more instructions. The chipset 1006 can further be configured to provide an interface to a computer-readable storage medium such as a read-only memory (ROM 1010) or non-volatile RAM (NVRAM) for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface controller 1012, which may provide access to external devices through, for example, a plurality of communication ports such as, but not limited to, a network interface card (NIC). A NIC may comprise a gigabit Ethernet adapter or similar component. The plurality of communication ports can be capable of connecting or otherwise coupling the device 1000 to other devices over the network 1040. It is contemplated that multiple communication ports, such as NICs may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, and data, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by a device 1000 or a plurality of devices operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the controller(s) 1004 can transition between states, as described above. In some embodiments, the device 1000 has access to computer-readable storage media storing computer-executable instructions which, when executed by the device 1000, perform the various processes described above with regard to FIGS. 1-10. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a virtual meeting logic 1024, that can be configured to perform one or more of the various steps, processes, operations, and/or other methods that are described above. Often, the virtual meeting logic 1024 can be a set of instructions stored within a non-volatile memory that, when executed by the processor(s) 1004 can carry out these steps, etc. In some embodiments, the virtual meeting logic 1024 may be a client application that resides on a network-connected device, such as, but not limited to, a personal or mobile computing device. In these embodiments, the virtual meeting logic 1024 can facilitate the establishment and conduct one or more virtual meetings within the device, such as those devices depicted in FIGS. 1 and 3-5. In certain embodiments, the virtual meeting logic 1024 may be configured to receive and process configuration suggestions that can direct one or more configurations, such as energy-saving settings to be either enabled or disabled or users to be connected or disconnected.

In a number of embodiments, the storage 1018 can include configuration data 1028. As described above, configuration data 1028 can be utilized to optimize the sustainability of a virtual meeting. In some embodiments, the configuration data 1028 can indicate the type of virtual meeting that will be conducted, as well as the types of devices that are likely to attend. The configuration data 1028 may also include, in certain embodiments, the network paths, devices, or types of connections that may be utilized during a virtual meeting. In still more embodiments, the configuration data 1028 can include various energy-saving or other features that can be enabled and/or disabled.

In still more embodiments, the storage 1018 may include meeting profile data 1030. Also described above, meeting profile data 1030 can be generated upon receiving data associated with the virtual meeting from each of the participants and their associated client devices. However, in some embodiments, that may not be necessary and the meeting profile data 1030 can be generated from a partial selection of historical data. The meeting profile data 1030 may include data related to the overall configurations available for the devices associated with the participants and/or their client computing devices. Indeed, in various embodiments, the meeting profile data 1030 can allow for the determination of an optimal configuration of settings throughout the virtual meeting in order to maximize the overall sustainability of the virtual meeting.

In still more embodiments, the storage 1018 can include activity data 1032. As described above activity data 1032 can include data associated with the activity or inactivity of various participants on the virtual meeting. The activity data 1032 can be associated with any changes or activity detected on a data stream, such as a video or audio data stream. In some embodiments, the activity data 1032 may include markings of which participants are inactive or have previously been marked as inactive.

Finally, in many embodiments, data may be processed into a format usable by one or more machine-learning (ML) model(s) 1026 (e.g., feature vectors), and or other pre-processing techniques. The ML model(s) 1026 may be any type of ML model, such as any of various supervised models, reinforcement models, and/or unsupervised models. The ML model(s) 1026 may include one or more of linear regression models, logistic regression models, decision trees, Naïve Bayes models, neural networks, k-means cluster models, random forest models, and/or other types of ML model(s) 1026.

The ML model(s) 1026 can be configured to generate inferences to make predictions or draw conclusions from data. An inference can be considered the output of a process of applying a model to new data. This can occur by learning from historical data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc.

The ML model(s) 1026 may be configured to predict the usage and/or configurations of a better sustainability-optimized virtual meeting. Likewise, the ML model(s) 1026 may be configured in certain embodiments to process various data to make a determination on whether a participant is inactive and/or if they should be disconnected from the virtual meeting. In some embodiments, the ML model(s) 1026 may be utilized to determine which specific participants are inactive or are under threat of being inactive.

Although a specific embodiment for a device suitable for carrying out the various steps, processes, methods, and operations described above is discussed with respect to FIG. 10, any of a variety of systems and/or processes may be utilized in accordance with embodiments of the disclosure. For example, the device may be virtualized or disposed as a logic and data stores within a mobile or personal general computing device, allowing for the transformation of the device, upon execution by a processor/controller, to a sustainability-aware virtual meeting device. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor;

a communication port coupled with a second device; and a virtual meeting logic configured to:

establish a virtual meeting with a plurality of participants;

monitor participant activity;

detect inactivity in at least one participant;

determine a power source associated with the at least one participant;

generate an inactivity prompt based on the determined power source, wherein the inactivity prompt is configured with a cancel option and an expiration timer; and disconnect, in response to the expiration timer expiring, the at least one participant.

2. The device of claim 1, wherein the virtual meeting logic is further configured to notify a virtual meeting server to mark the at least one participant as inactive.

3. The device of claim 1, wherein the inactivity is detected via one or more machine learning processes.

4. The device of claim 3, wherein the one or more machine learning processes are configured to accept audio data and video data associated with the at least one participant.

5. The device of claim 4, wherein the one or more machine learning processes are configured to indicate inactivity in response to a lack of audio data associated with the at least one participant.

6. The device of claim 4, wherein the one or more machine learning processes are configured to indicate inactivity in response to a lack of change in the video data associated with the at least one participant.

7. The device of claim 4, wherein the cancel option is configured to be engaged by detecting a change in the audio data or video data.

8. The device of claim 1, wherein the cancel option is an engageable button presented on a graphical user interface.

9. The device of claim 1, wherein the virtual meeting logic is further configured to, in response to detecting inactivity in at least one participant, lower a quality of the virtual meeting associated with the at least one participant.

10. The device of claim 9, wherein lowering the quality of the virtual meeting comprises reducing a video data bit rate.

11. The device of claim 9, wherein lowering the quality of the virtual meeting comprises reducing an audio data bit rate.

12. A device, comprising:

a processor;

a memory communicatively coupled to the processor;

a communication port coupled with a second device; and a virtual meeting logic configured to:

establish a virtual meeting with a participant on a first device;

monitor participant activity;

detect inactivity of the participant;

determine a power source associated with the first device;

determine the participant joining the virtual meeting on a second device;

generate an inactivity prompt for display on the first device and second device based on the determined power source;

receive an acknowledgement of the inactivity prompt; and disconnect the participant from at least one device.

13. The device of claim 12, wherein:

the acknowledgement is received from the second device; and the participant is disconnected from the first device.

14. The device of claim 12, wherein:

the acknowledgement is received from the first device; and the participant is disconnected from the second device.

15. The device of claim 13, wherein the inactivity prompt is formatted to indicate inactivity of the first device.

16. The device of claim 15, wherein the second device is blocked from joining the virtual meeting until an acknowledgment is received.

17. A method of conducting sustainable virtual meetings, comprising:

establishing a virtual meeting with a plurality of participants;

monitoring one or more activities of each of the plurality of participants;

detecting inactivity associated with at least one participant of the plurality of participants;

determining a power source associated with the at least one participant;

generating an inactivity prompt based on the determined power source, wherein the inactivity prompt is configured with a cancel option and an expiration timer;

transmitting the inactivity prompt to the at least one participant; and disconnecting, in response to the expiration timer expiring, the at least one participant.

18. The method of claim 17, wherein the at least one participant is associated with a plurality of devices and the inactivity prompt is transmitted to each of the plurality of devices.

19. The method of claim 18, wherein inactivity is detected by monitoring data associated with the plurality of devices.

20. The method of claim 19, wherein the plurality of devices comprises a primary device and a secondary device, and the inactivity prompt is not sent to the secondary device.

* * * * *